Patented Aug. 5, 1924.

1,504,178

UNITED STATES PATENT OFFICE.

GEORGE YOUNG, OF LONDON, ENGLAND, ASSIGNOR OF ONE-THIRD TO AUGUSTUS DACRE LACY, AND ONE-THIRD TO RICHARD CHARLES DENINGTON, BOTH OF LONDON, ENGLAND.

PROCESS FOR THE PRODUCTION OF ETHERS OF CARBOHYDRATES.

No Drawing. Application filed August 28, 1922. Serial No. 584,860.

*To all whom it may concern:*

Be it known that GEORGE YOUNG, a subject of the King of Great Britain, residing at London, England, has invented a certain new and useful Process for the Production of Ethers of Carbohydrates, of which the following is a specification.

This invention relates to a process or chemical reaction whereby a new class of products of the nature of ethers is obtained when carbo-hydrates are treated with alkyl chlorides in the presence of a metallic hydroxide resulting in the production of ethers of carbo-hydrates which are insoluble in alcohol.

It has been previously proposed to prepare alkyl ethers of cellulose by the use of alkyl chlorides but such products obtained have differed in that they are soluble in alcohol or water whereas the products that I have obtained are insoluble in both alcohol and in water. The formation of ethers of cellulose and especially of regenerated cellulose by the action of dialkyl sulphates and of alkyl or aralkyl haloids is already known. The use of some of the reagents is accompanied by serious drawbacks or disadvantages. Of the dialkyl sulphates only the two lowest members of the possible series are available and these have each only one half of the total alkyl radicles available for ether formation. The bromides tend to hydrolyze with the formation of the corresponding alcohol or di-alkyl oxide (or ether) with consequent loss of material. The alkyl iodides, whilst having the advantage of the highest speed of reaction, are too expensive for commercial use. Moreover, in many cases the production of sufficiently etherified products by the use of the above-mentioned reagents have been accomplished only by repeated treatments with consequent serious losses both of the carbo-hydrate and of the reagent employed. So far as I am aware the processes previously practised or described differ from my process as hereinafter described in that the products obtained by them whether stable or unstable to water have all in common the property of being soluble in alcohol, benzine or water.

I find that the use of alkyl chlorides according to my invention results in the formation of stable ethers of the carbo-hydrates, suitable for use in the arts, such formation taking place in one treatment and in an economical manner.

I have found that products of the nature of ethers and having the properties of insolubility in alcohol, benzine and water, are obtained when carbo-hydrates of the general formula $(C_6H_{10}O_5)_n$ are treated with alkyl chlorides, such as methyl or ethyl chlorides, or with aralkyl chlorides such as benzyl chloride, at a temperature of from 100° to 150° centigrade, in the presence of a alkali hydroxide, and in the presence of a limited amount of water.

As the carbo-hydrate I may use any convenient form of cellulose, starch, dextrin, or other carbo-hydrate of the general formula given.

As the alkyl chloride I may use methyl chloride, ethyl chloride, propyl chloride, butyl chloride, or amyl chloride.

If the alkyl radicle can exist in more than one form I may use either the normal or an isomeric form, for example I may use either normal propyl chloride, $CH_3CH_2CH_2Cl$, or iso propyl chloride, $(CH_3)_2CHCl$.

I have found the most economical and convenient metallic hydroxide to be sodium hydroxide which is preferably used in my process, but it will be understood that other metallic hydroxides may be used in place of the sodium hydroxide.

The reaction may be facilitated by the addition of a catalyst such as finely divided copper, as also by the addition of an organic solvent such as benzine, which does not react or enter into combination under the conditions of the process with the reacting substances nor with the water.

According to my invention I use an intimate mixture of approximately two parts of the carbo-hydrate with two to three parts of caustic alkali and one to one and a half parts of water respectively.

An intimate mixture of the carbo-hydrate, caustic alkali and water in the above proportions is easily and conveniently obtained in the following manner:—

The cellulose or other carbo-hydrate is soaked for about 30 minutes in an aqueous solution containing 40 per cent or thereabouts of the caustic alkali; the resulting mass is then subjected to gentle pressure until the excess of liquid has been expressed, such expressed liquid being correspondingly weaker in alkali.

The addition of the caustic alkali and water may be effected also by the addition of these either together or separately in the quantities specified to the carbohydrate and mixing by grinding or mixing in a mixing machine, but I prefer the method of soaking and pressing as described above.

The proportions of caustic alkali and water to the cellulose may be increased, but the amount of water must not be materially more than half of the weight of the caustic alkali.

A concentrated caustic alkali such as is used in my process does not cause degradation or hydrolysis of either the cellulose molecule or the alkyl chloride. It is true that as the action with the alkyl chloride proceeds the ratio of caustic alkali to water changes, because water is formed by the reaction whilst alkali is consumed. It must be assumed that hydrolytic action is prevented by saturation of the excess of water by the sodium chloride formed during the reaction.

Whilst an excess of caustic alkali and water as set forth above does not change the nature of the reaction or of the products, it is certainly desirable to approach as closely as possible the proportions given above, as any excess of alkali tends to form a protective coating round the carbo-hydrate and so to hinder the action with the chloride.

For my process an excess of the alkyl chloride is used and preferably added in the proportion of about 20 molecular weights to one molecular weight of the carbo-hydrate $C_6H_{10}O_5$.

It is necessary to employ an excess of the alkyl chloride to ensure complete etherification, but a large part of the excess which is employed acts merely in assisting to permeate the carbo-hydrate mass.

I have found that with methyl chloride and ethyl chloride, the reaction takes place with sufficient rapidity and completeness at a temperature of 100° centigrade, at which no deterioration of the cellulose takes place. With the higher members of the series, namely propyl, butyl and amyl chlorides, which have a decreasing reaction velocity, I find that satisfactory results can be obtained only if the reaction be carried out at temperatures above 100°, but preferably not above 130° centigrade. The time of heating required is 6–8 hours.

As with these alkyl chlorides the reaction is carried out at temperatures above the boiling point of the alkyl chloride employed, it is necessary to heat the reacting mixture in an autoclave or closed vessel under pressure.

The cellulose, treated as above described with alkali hydroxide, is introduced into the autoclave or other reaction vessel, and the requisite amount of alkylating agent or mixture of alkylating agent and neutral solvent is then added.

As methyl chloride boils at −23° C. and exerts a pressure of 60 lbs. to the square inch at the ordinary temperature, the addition of this alkylating agent must necessarily be effected by special means, either by pumping the gas into the autoclave or by injection of the liquid from a cylinder under pressure.

In a less degree the above directions apply also to ethyl chloride, which must be introduced into the reaction vessel under pressure unless the autoclave and ethyl chloride be cooled to 8° C. when the ethyl chloride may be poured in in the same manner as is to be done with the higher boiling reagents.

The autoclave may be heated in a water or oil bath or by steam or in any other convenient manner. In the case of methyl or ethyl chloride I prefer to use a water bath heated by a steam jet or coil, as this method has the advantage of not requiring any supervision of the temperature. With the other alkyl chlorides the autoclave is preferably heated in an oil bath.

In all cases, when large amounts of material are being treated, it is advisable to maintain contact between fresh surfaces of the carbo-hydrate and the reagent by stirring. Any suitable mechanical stirrer may be employed for this purpose, or if the reaction is carried out in an autoclave the desired result is achieved preferably by mechanical rotation of the reaction vessel in the bath.

In all cases according to my process an excess of the alkyl chloride is employed. The unattacked excess can readily be recovered. In the case of an alkyl chloride I distil it straight out of the autoclave or it may be poured off into another vessel before distillation.

The other product obtained as above described by distilling off the excess of reagent is washed with water to remove unchanged alkali and can then be purified by taking advantage of its solubility as hereinafter described. The carbo-hydrate ethers prepared as described above are stable to either cold or hot water and are insoluble in cupraammonium solutions.

The ethers formed by my process derived from alkyl chlorides are specially characterized and differentiated from the ethers of cellulose heretofore obtained in that the products are insoluble in methyl or ethyl alcohol and in benzine.

The new ethers derived from alkyl chlorides are soluble especially in glacial acetic acid from their solution in which they are precipitated in thread-like masses when poured into water.

I have used this solubility in glacial acetic acid and the precipitation from such solution by means of water as a means of purifying and of identifying my products.

When heated the alkyl ethers of cellulose prepared in the manner described melt with slight coloration at a temperature of about 200° C.

The new ethers of cellulose obtained by the process above described may be used with suitable solvents or with plasticizing materials or with a combination of plasticizing material and solvent for the manufacture of artificial threads, films for photographic and other purposes, varnishes, plastic masses, and in general the use to which cellulose ethers have been put or which have been suggested for these substances.

Having thus described my process and the conditions under which certain products may be obtained I desire it to be understood that the conditions set forth as to proportions of materials and times of reactions need not be adhered to rigidly, but I have found that the proportion of water to the caustic alkali must not be materially greater than 1:2.

The use of the chloride entails some sacrifice of speed of reaction but has the important advantage that the formation of by-products such as the alcohol or the dialkyl oxide is totally or almost totally eliminated.

Moreover, the process which I have described is one essentially suitable for use in commercial practice and gives good yields approaching the theoretically possible both as to the amount of carbo-hydrate employed and as to the amount of alkyl chloride consumed.

There is little, if any, destruction of the carbo-hydrate which enters totally or almost totally into reaction, as is shown for example in the case of cellulose by the complete insolubility of the product in cupraammonium solution.

The excess of the alkyl chloride which does not enter into the reaction is easily and within ordinary working limits quantitatively recovered as already described.

The excess of alkali hydroxide used is very small.

Mixed ethers may also be obtained in one operation by the use of a mixture of chlorides, as for example a mixture of methyl chloride and ethyl chloride.

What I claim is:—

1. Process for the production of ethers of cellulose which are insoluble in alcohol and benzine which consists in firstly soaking said cellulose in an aqueous solution containing about 40 per cent of caustic alkali, the resulting mass being subjected to gentle pressure to rid said mass of excess of liquid and then subjecting the cellulose to be treated to the action of an alkyl chloride at a temperature of from 100° to 150° centigrade in an ordinary autoclave.

2. Process for the production of ethers of cellulose which consists in intimately mixing the cellulose with a 40 per cent aqueous solution of caustic soda, the resulting mass being subjected to gentle pressure for the removal of the excess of liquid so that the residue consists approximately of two parts of cellulose with 2 or 3 parts of caustic alkali and 1 to 1½ parts of water, by weight respectively, when the cellulose thus treated is placed into the autoclave or other reaction vessel and the alkylating agent is introduced in about the proportion of 20 molecular weights to one molecular weight of the cellulose to be treated, such autoclave or other reaction vessel being heated to 100° to 150° centigrade, and the mass agitated by any convenient means whereby the complete reaction takes place within 6 to 8 hours resulting in a product that is insoluble in alcohol.

3. Process for the production of ethers of cellulose which are insoluble in alcohol and benzine, which consists in firstly soaking said cellulose in an aqueous solution containing about 40 per cent of caustic alkali, the resulting mass being subjected to gentle pressure to rid said mass of excess of liquid and then subjecting the cellulose to be treated to the action of an alkyl chloride at a temperature of from 100° to 150° centigrade, dissolving the ethers so obtained in glacial acetic acid and precipitating the product from such solution by means of water in thread-like masses.

In testimony whereof I affirm my signature.

GEORGE YOUNG.